(12) United States Patent
Perng et al.

(10) Patent No.: US 10,033,041 B2
(45) Date of Patent: Jul. 24, 2018

(54) ARTIFICIAL SEI CATHODE MATERIAL AND LITHIUM SECONDARY BATTERY COMPRISING THE SAME

(71) Applicant: SILVER H-PLUS TECHNOLOGY CO., LTD., Taichung (TW)

(72) Inventors: Li-Hsiang Perng, Kaohsiung (TW); Chen-Chun Chuang, Taipei (TW); Chih-Chan Lin, Tainan (TW)

(73) Assignee: SILVER H-PLUS TECHNOLOGY CO., LTD., Taichung (TW)

( * ) Notice: Subject to any disclaimer, the term of this patent is extended or adjusted under 35 U.S.C. 154(b) by 424 days.

(21) Appl. No.: 14/769,679

(22) PCT Filed: Nov. 7, 2014

(86) PCT No.: PCT/CN2014/090543
§ 371 (c)(1),
(2) Date: Aug. 21, 2015

(87) PCT Pub. No.: WO2016/070399
PCT Pub. Date: May 12, 2016

(65) Prior Publication Data
US 2016/0336599 A1 Nov. 17, 2016

(51) Int. Cl.
| | | |
|---|---|---|
| *H01M 4/62* | (2006.01) | |
| *H01M 4/505* | (2010.01) | |
| *H01M 4/525* | (2010.01) | |
| *H01M 4/36* | (2006.01) | |
| *H01M 4/02* | (2006.01) | |
| *H01M 10/0525* | (2010.01) | |
| *H01M 4/131* | (2010.01) | |
| *H01M 4/58* | (2010.01) | |
| *H01M 4/136* | (2010.01) | |
| *H01M 4/50* | (2010.01) | |
| *H01M 4/52* | (2010.01) | |

(52) U.S. Cl.
CPC ........... *H01M 4/622* (2013.01); *H01M 4/131* (2013.01); *H01M 4/136* (2013.01); *H01M 4/366* (2013.01); *H01M 4/502* (2013.01); *H01M 4/505* (2013.01); *H01M 4/523* (2013.01); *H01M 4/525* (2013.01); *H01M 4/5825* (2013.01); *H01M 4/624* (2013.01); *H01M 4/625* (2013.01); *H01M 4/628* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2002/0012846 A1* | 1/2002 | Skotheim | ............ | H01M 2/1673 429/231.95 |
| 2010/0062333 A1* | 3/2010 | Chuang | ............... | H01M 10/058 429/204 |
| 2014/0072879 A1* | 3/2014 | Chen | ....................... | H01M 4/60 429/300 |
| 2014/0141340 A1 | 5/2014 | Egorov et al. | | |

FOREIGN PATENT DOCUMENTS

| | | | | |
|---|---|---|---|---|
| CN | 102055015 A | 5/2011 | | |
| CN | 103094527 A | 5/2013 | | |
| CN | 103219492 | * 7/2013 | ............ | H01M 4/136 |
| CN | 103219492 A | 7/2013 | | |

OTHER PUBLICATIONS

Larousserie, David, "Graphene—the new wonder material," The Guardian Weekly, Nov. 22, 2013; retrieved from https://www.theguardian.com/science/2013/nov/26/graphene-molecule-potential-wonder-material.*
Xu, Xiaozhi et al., "Interfacial engineering in graphene bandgap," (Abstract), From the Journal: Chemical Society Reviews, Issue 9, 2018; retrieved from http://pubs.rsc.org/en/content/articlelanding/2018/cs/c7cs00836h#!divAbstract.*
Colapinto, John, "Material Question, Graphene may be the most remarkable substance ever discovered. But what's it for?," Annals of Innovation, Dec. 22 & 29, 2014 Issue; retrieved from https://www.newyorker.com/magazine/2014/12/22/material-question.*

* cited by examiner

*Primary Examiner* — Rena Dye Cronin
(74) *Attorney, Agent, or Firm* — Muncy, Geissler, Olds & Lowe, P.C.

(57) ABSTRACT

Disclosed herein is an artificial solid electrolyte interface (SEI) cathode material for use in a rechargeable battery, particularly a lithium battery. The artificial SEI cathode material includes in its structure, a cathode material, and a conductive polymer/carbon composite encapsulating the cathode material for forming an artificial solid electrolyte interface (SEI) around the cathode in the secondary battery, in which the conductive polymer/carbon composite is no more than 5% by weight of that of the artificial cathode material. Also provided herein is a lithium secondary battery including a cathode formed from the artificial SEI cathode material that renders the lithium secondary battery a reduced level of equivalent series resistance (ESR), an enhanced level of capacitance, and a long cycle life-time.

19 Claims, 11 Drawing Sheets

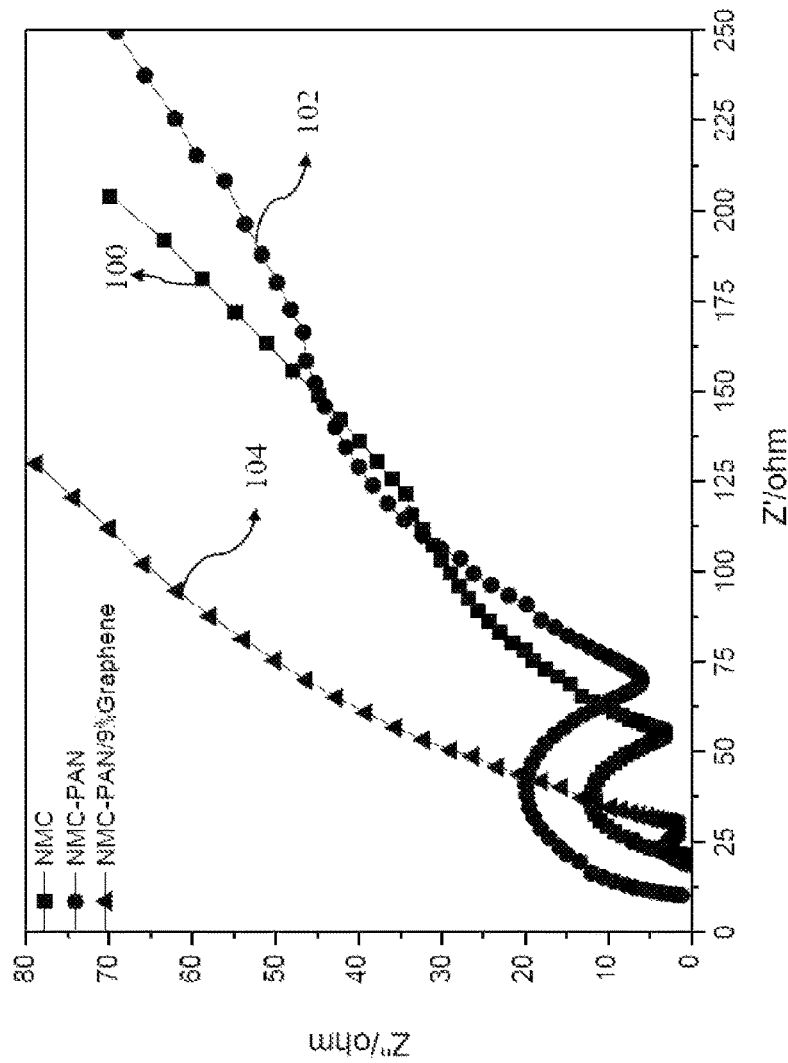
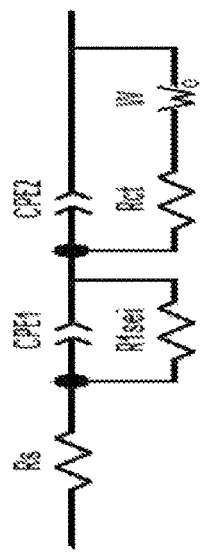
FIG 1B
FIG 1A

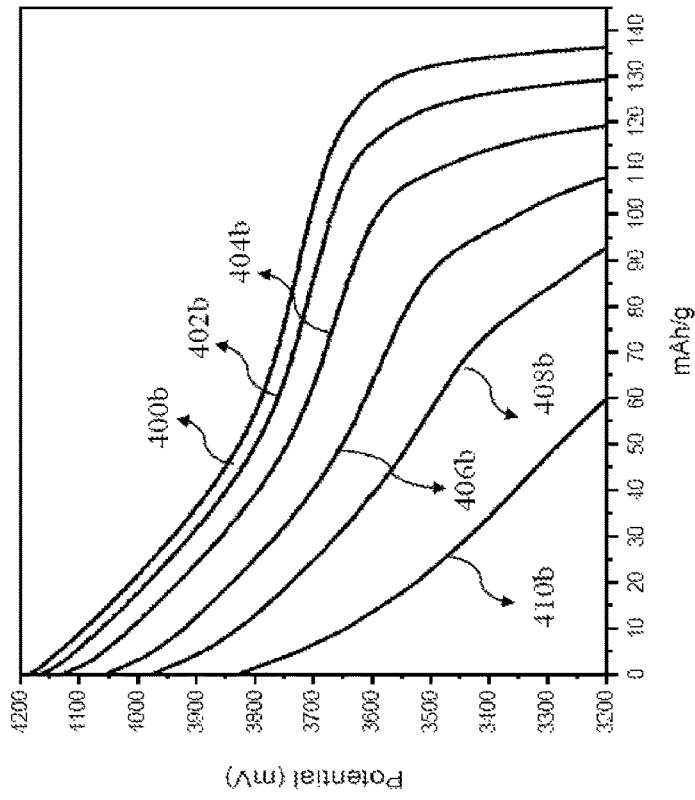
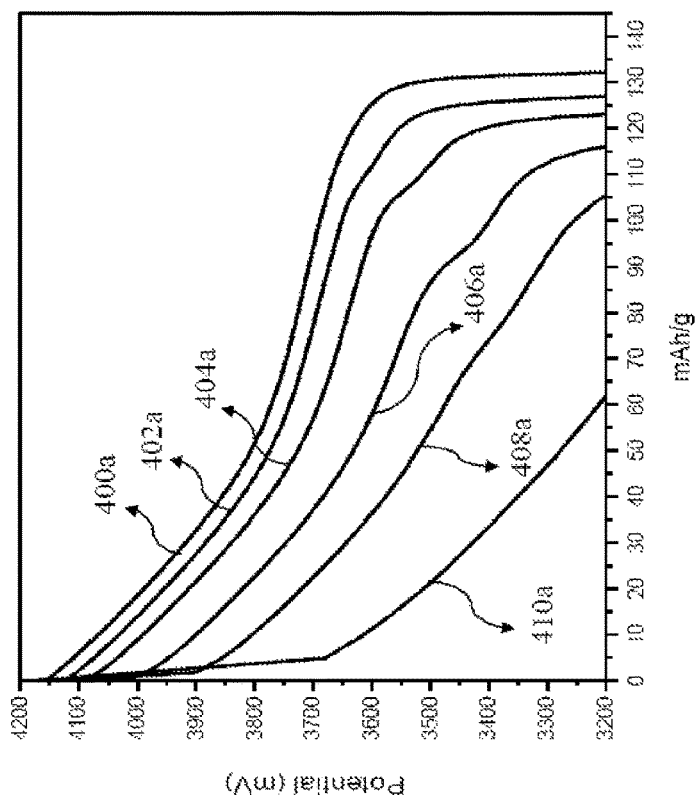
FIG. 4A  (A) NMC
FIG. 4B  (B) NMC-PAN/9% Graphene

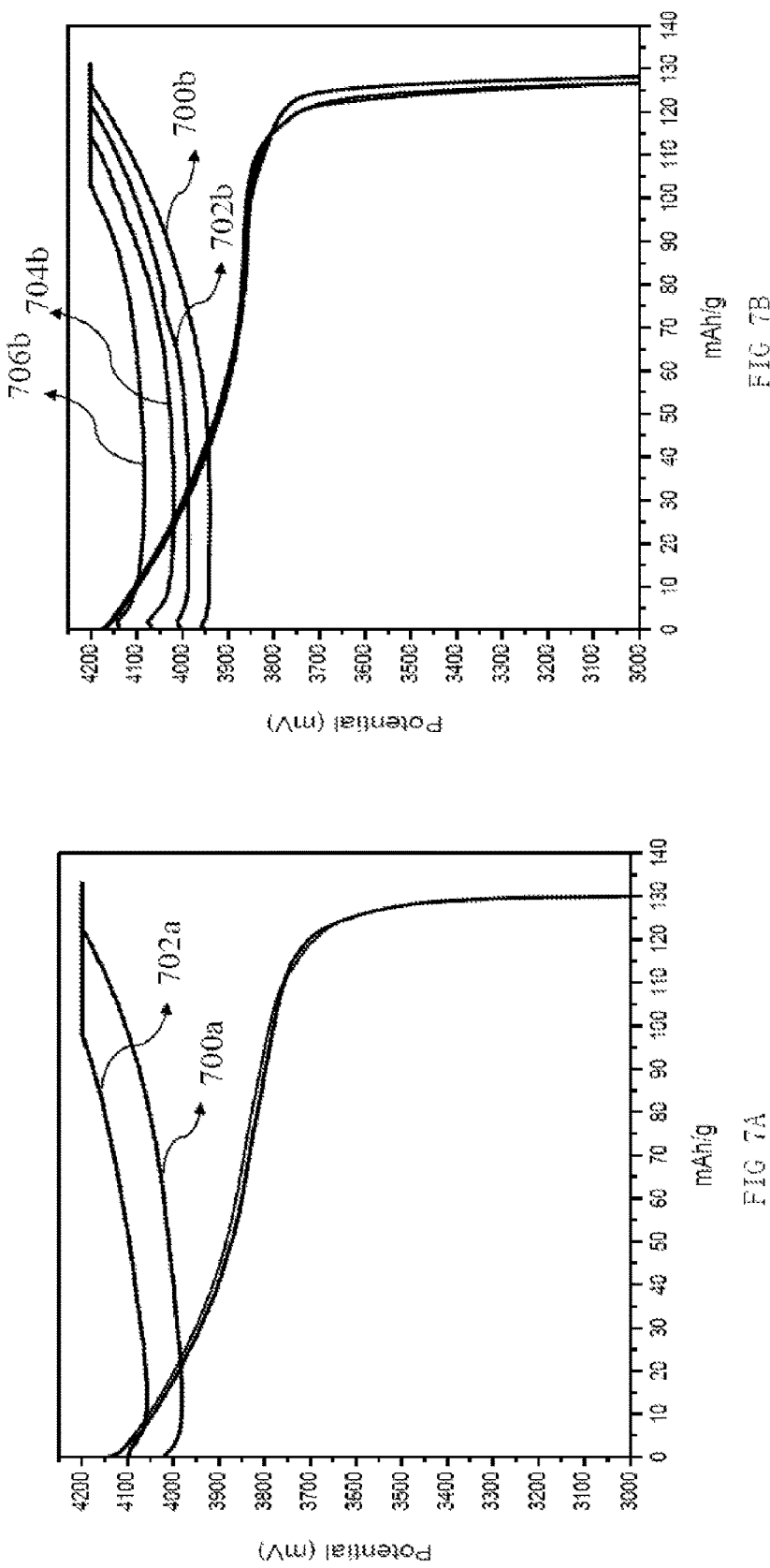

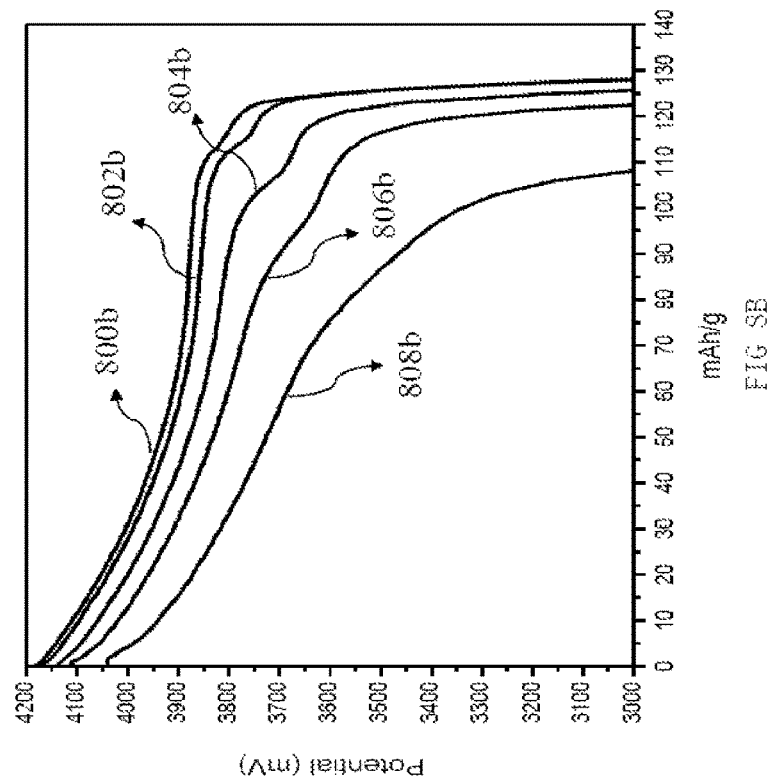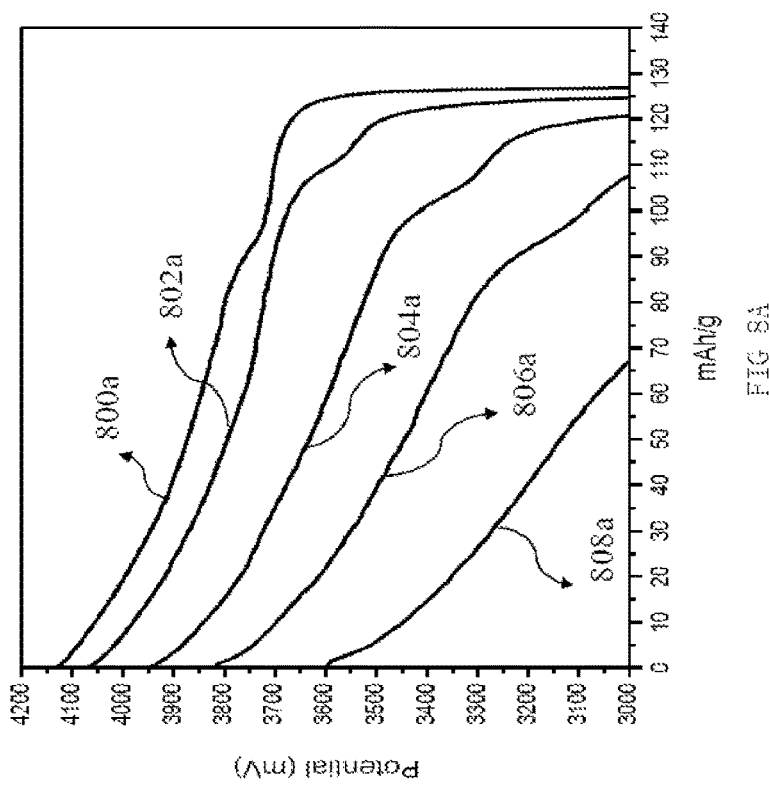

ARTIFICIAL SEI CATHODE MATERIAL AND LITHIUM SECONDARY BATTERY COMPRISING THE SAME

BACKGROUND OF THE INVENTION

1. Field of the Invention

The present disclosure relates to a novel artificial SEI cathode material for use in a rechargeable lithium-ion battery. Accordingly, the present disclosure also relates to a lithium-ion battery comprising a cathode formed from the afore-mentioned novel artificial SEI cathode material.

2. Description of Related Art

Lithium-ion secondary battery includes a cathode and an anode including materials in which lithium intercalation/de-intercalation reversibly occurs as the cathode and anode active materials, and an organic electrolyte present between the cathode and anode electrodes. The batteries produce and store electric energy by a redox reaction when the lithium ions are intercalated into and de-intercalated from the cathode electrode and the anode electrode.

The performance of cathode material in the conventional lithium-ion battery is often limited by irreversible capacity loss (ICL) in the first cycle caused by solvent decomposition on the cathode surface, as well as the irreversible insertion of lithium ion into the cathode layer that lead to the formation of a passive film (i.e., a solid electrolyte interface (SEI) layer) on the cathode surface. The ICL also manifested in high impedance values observed in the beginning of the first charge and discharge cycle of the lithium battery, however, such phenomenon is often discarded by the skilled artisan in this field on the assumption that the electrodes are blocked by the formation of SEI film that resulted in high internal resistance on the cathode surface or by attributing it to be part of the charge-transfer resistance. The commercial available coin cell type lithium-ion battery typically claims an equivalent series resistance (ESR) value in the range of 30-200 ohms, with the majority being above 75 ohms. The high resistance translates to large ohmic losses in the capacity of the battery during the charge and discharge phases, such losses further adversely affects the battery by interfering with the its ability to be efficiently charged and/or discharged in a short period of time. Thus, it is reasonable to conclude that the normal operation of a lithium battery is closely connected to the stability and conductivity of SEI film.

Accordingly, there exists in the art a need for an improved cathode material, in which a relatively stable and conductive SEI film may be formed on at least part of the surface of the cathode material, so that when the cathode formed from the improved artificial cathode material of the present disclosure is incorporated into a rechargeable lithium battery, improved electrochemical properties such as a low ESR, an enhanced capacitance, and a long cycle lifetime are rendered to the rechargeable lithium battery.

SUMMARY

In view of the afore-identified problems, main objective of the present disclosure is to provide an artificial SEI cathode material usable in rechargeable electrochemical cell, particularly in a lithium secondary battery. The rechargeable secondary battery incorporating a cathode formed from the artificial SEI cathode material of the present disclosure exhibits improved electrochemical properties, such as a reduced level of equivalent series resistance (ESR), an enhanced capacitance and a long cycle lifetime, due to the formation of a stable SEI layer around the cathode of the rechargeable secondary battery.

Generally, in one aspect, the present disclosure provides an artificial SEI cathode material, which includes a cathode material, and a conductive polymer/carbon composite encapsulating the cathode material and forms a solid electrolyte interface (SEI) around the cathode of the secondary battery, wherein the conductive polymer/carbon composite is no more than 5% by weight of that of the artificial SEI cathode material. In some embodiments, the conductive polymer/carbon composite is no more than 2% by weight of that of the artificial SEI cathode material. In other embodiments, the conductive polymer/carbon composite is no more than 1% by weight of that of the artificial SEI cathode material.

According to various embodiments of the present disclosure, the cathode material may be any of lithium iron phosphate (LFP), lithium manganese phosphate (LMP), lithium cobalt oxide (LCO), lithium manganese oxide (LMO), lithium nickel oxide (LNO), lithium nickel manganese cobalt oxide (NMC), lithium nickel cobalt aluminum oxide (NCA) or lithium titanate (LTO). In one example, the cathode material is NMC; whereas in another example, the cathode is LCO.

According to various embodiments of the present disclosure, the conductive polymer/carbon composite is composed of a conductive polymer and a carbon material, in which the carbon material is no more that 25% by weight of that of the conductive polymer/carbon composite. Preferably, the carbon material is no more that 20% by weight of that of the conductive polymer/carbon composite. More preferably, the carbon material is no more that 12% by weight of that of the conductive polymer/carbon composite. Still more preferably, the carbon material is no more that 9% by weight of that of the conductive polymer/carbon composite.

According to various embodiments of the present disclosure, the conductive polymer is selected from the group consisting of polyaniline (PAN), polypyrrole, polyindole, polythiophene, polycarbozole, polyazepines, polyfluorene, polyphenylenes, and a copolymer thereof; and the carbon material is selected from the group consisting of carbon nanotube, carbon nanofiber, fullerene, active carbon, graphite, graphene and a combination thereof.

In some preferred examples, the conductive polymer/carbon composite is polyaniline/graphene composite, in which the graphene is about 9-18% by weight of that of the polyaniline/graphene composite.

In one embodiment of the present disclosure, the artificial SEI cathode material exhibits at least 13% improved discharge capacity at 3 C rate, when compared with that of a control cathode, in which the cathode material is not encapsulated by the conductive polymer/carbon composite of the present disclosure.

In yet another embodiment of the present disclosure, the artificial SEI cathode material exhibits at least 60% improved discharge capacity at 5 C rate, when compared with that of a cathode material not encapsulated by the conductive polymer/carbon composite of the present disclosure.

In still another embodiment, the artificial SEI cathode material exhibits cycling stability in the range of 85-90% at 0.5 C rate after 50 cycles when cycled between 3.0-4.2 V.

Accordingly, a further aspect of the present disclosure is to provide a lithium secondary battery that includes, a cathode formed from the artificial SEI cathode material of the present invention, an anode, and an electrolyte. The lithium secondary battery is characterized in having low ESR, high specific capacity and long cycle lifetime, in which under the same charge and discharge conditions, the ESR ratio between the lithium secondary battery and a control lithium battery is lower than 1; and the current intensity ratio between the lithium secondary battery and the control lithium battery is greater than 1; and the control lithium battery is characterized in that its cathode material is not encapsulated by the conductive polymer/carbon composite of the present disclosure.

In some embodiments of the present disclosure, the artificial SEI cathode material comprises a NMC cathode material, and a polyaniline/graphene composite encapsulating the NMC cathode material, wherein the polyaniline/graphene composite is about 1% by weight of the artificial SEI cathode material, and the graphene is about 9% by weight of that of the polyaniline/graphene composite.

In other embodiments, the artificial SEI cathode material comprises a LCO cathode material, and a polyaniline/graphene composite encapsulating the LCO cathode material, wherein the polyaniline/graphene composite is about 1% by weight of the artificial SEI cathode material, and the graphene is about 11% by weight of that of the polyaniline/graphene composite.

In some embodiments, the lithium secondary battery reaches 86% charging capacity in about 20 min at the rate of 3 C: and 68% charging capacity in about 9 minutes at the rate of 5 C.

In other embodiments, the lithium secondary battery exhibits discharge capacity in the range of 105-128 mAh/g at 0.5 C-5 C rate for the first cycle.

In still other embodiments, the lithium secondary battery reaches 96% charge capacity in about 64 min at the rate of 1 C, and 78% charge capacity in about 18 min at the rate of 3 C.

In still some embodiments, the lithium secondary battery exhibits cycling stability in the range of 85-90% after 50 cycles when cycled between 3.0V-4.2 V.

The details of one or more embodiments of the invention are set forth in the accompanying description below. Other features and advantages of the invention will be apparent from the detail descriptions, and from claims.

BRIEF DESCRIPTION OF THE DRAWINGS

The present description will be better understood from the following detailed description read in light of the accompanying drawings, where:

FIG. 1A is a schematic drawing of a Randes-type half-cell equivalent circuit;

FIG. 1B are Nyquist plots of NMC coin cells respectively illustrating the AC impedance spectrums of NMC cathodes with or without the encapsulated polyaniline of example 1.1.1 and polyaniline/graphene composite of example 1.1 in accordance with one embodiment of the present invention;

FIGS. 4A and 4B are plots of discharging profiles of (A) the control NMC coin cell and (B) NMC coin cell comprising the conductive polymer/graphene composite of example 1.1 respectively at 0.2 C, 0.5 C, 1 C, 2 C, 3 C and 5 C in accordance with one embodiment of the present disclosure;

FIG. 7A are plots of charging profiles of the control LCO coin cell respectively at 0.5 C and 1 C in accordance with one embodiment of the present disclosure;

FIG. 7B are plots of charging profiles of LCO coin cell comprising polyaniline/11% graphene composite of example 1.1.2 respectively at 0.5 C, 1 C, 2 C and 3 C in accordance with one embodiment of the present disclosure;

FIG. 8A are plots of discharging profiles of the control LCO coin cell respectively at 0.5 C, 1 C, 2 C, 3 C and 5 C in accordance with one embodiment of the present disclosure;

FIG. 8B are plots of discharging profiles of LCO coin cell comprising polyaniline/11% graphene composite of example 1.1.2 respectively at 0.5 C, 1 C, 2 C, 3 C and 5 C in accordance with one embodiment of the present disclosure;

DESCRIPTION

Figure 2:
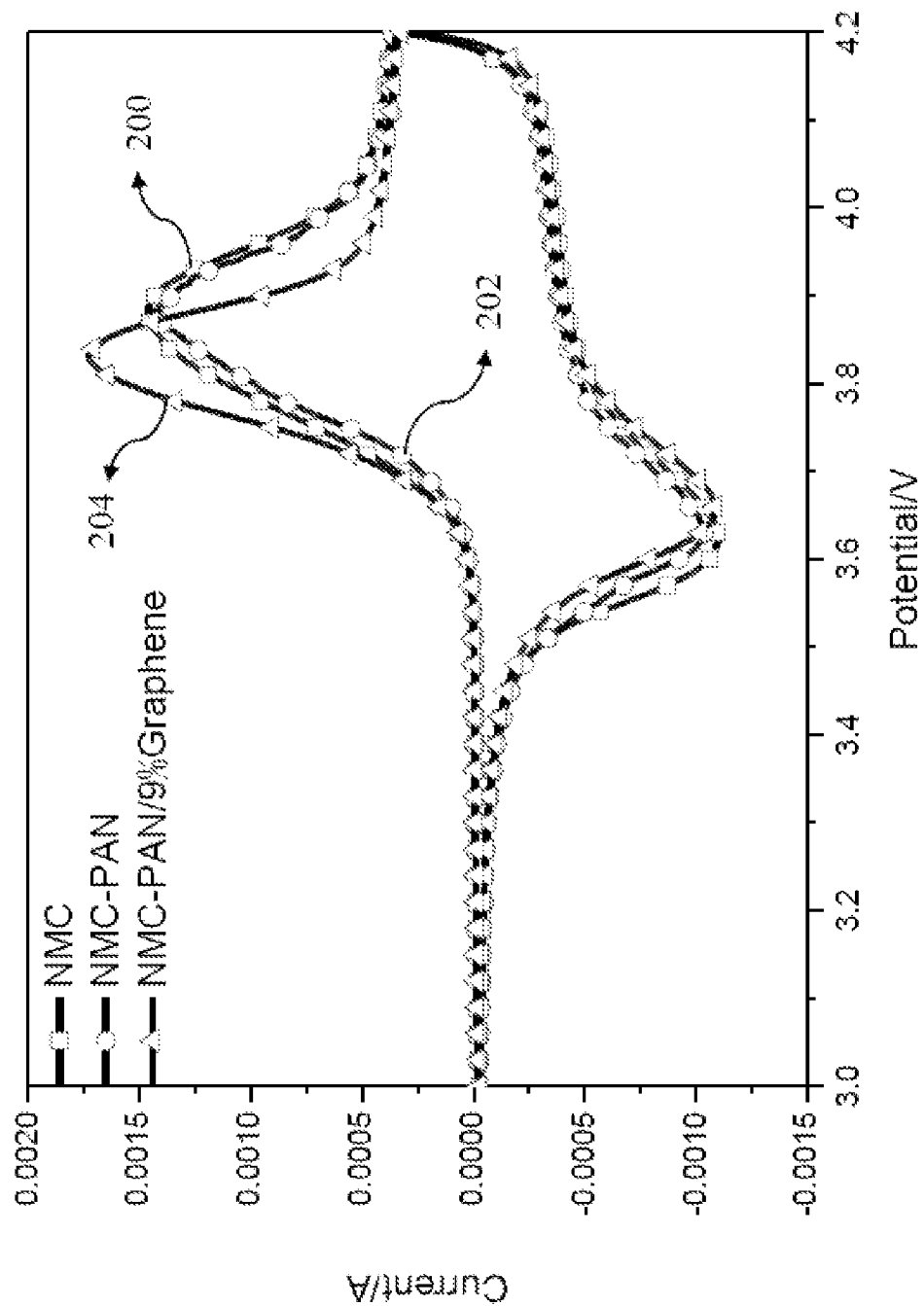
FIG. 2 are the cyclic voltammetry plots of the NMC coin cells of FIG. 1.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the present disclosure, a novel artificial SEI cathode material is developed for use in a rechargeable lithium battery. The rechargeable lithium battery comprising the novel artificial SEI cathode material of the present disclosure exhibits improved electrochemical properties, including low equivalent series resistance (ESI), high specific capacity, and a long cycle lifetime.

The present disclosure is based, at least in part, on the development of a novel artificial SEI cathode material useable in a lithium secondary battery. The artificial SEI cathode material includes in its structure, a cathode material, and a conductive polymer/carbon composite encapsulating the cathode material for forming a solid electrolyte interface (SEI) in the secondary battery, in which the conductive polymer/carbon composite is no more than 5% by weight of that of the artificial SEI cathode material. Preferably, the conductive polymer/carbon composite is no more than 2% by weight of that of the artificial SEI cathode material. Most preferably, the conductive polymer/carbon composite is no more than 1% by weight of that of the artificial SEI cathode material.

The conductive polymer/carbon composite may be produced in accordance with procedures described in the examples of the present disclosure. In general, it is formed by allowing a monomer of a conductive polymer and a carbon material to react in an acidic condition in the presence of an initiator, such as ammonium peroxydisulfate. The reaction is preferably performed at a low temperature, such as below 4° C., and more preferably at about 0° C.

Typically, the thus produced conductive polymer/carbon composite is composed of a conductive polymer and a carbon materials in a weight ratio of at least 3:1, such as 3:1, 4:1, 5:1, 6:1, 7:1, 8:1, 9:1, 10:1, 11:1, 12:1, and etc. In typical examples, the carbon material is no more than 25% by weight of that of the conductive polymer/carbon composite, such as 25%, 24%, 23%, 22%, 21%, 20%, 19%, 18%, 17%, 16%, 15%, 14%, 13%, 12%, 11%, 10%, 9%, 8%, 6%, 5%, 4%, 3%, 2% and 1% by weight of that of the conductive polymer/carbon composite. In certain examples, the carbon material is about 9% by weight of that of the conductive polymer/carbon composite. In other examples, the carbon material is about 11% by weight of that of the conductive polymer/carbon composite. In still other examples, the carbon material is about 18% by weight of that of the conductive polymer/carbon composite.

Examples of the conductive polymer suitable for manufacturing the present conductive polymer/carbon composite include, but are not limited to, polyaniline, polypyrrole, polyindole, polythiophene, polycarbozole, polyazepines, polyfluorene, polyphenylene and a copolymer thereof. Examples of the carbon material suitable for manufacturing the present conductive polymer/carbon composite include, but are not limited to, carbon nanotube, carbon nanofiber, fullerene, active carbon, graphite, graphene and a combination thereof.

According to embodiments of the present disclosure, the conductive polymer/carbon composite of the present disclosure may be polyaniline/graphene composite, polypyrrole/graphene composite, polyindole/graphene composite, polyaniline-co-indole/graphene composite, polythiophene/graphene composite, polyaniline/carbon nanotube composite, polypyrrole/carbon nanotube composite, polyindole/carbon nanotube composite, polyaniline-co-indole/carbon nanotube composite, polythiophene/carbon nanotube composite, polyaniline/graphite composite, polypyrrole/graphite composite, polyindole/graphite composite, polyaniline-co-indole/graphite composite, polythiophene/graphite e composite, and etc. According to some examples, the conductive polymer/carbon composite is polyaniline/graphene composite, in which the graphene is about 6-20% by weight of that of the polyaniline/graphene composite, such as 6%, 7%, 8%, 9%, 10%, 11%, 12%, 13%, 14%, 15%, 16%, 17%, 18%, 19% and 20% by weight of that of the polyaniline/graphene composite: preferably the graphene is about 8-18% by weight of that of the polyaniline/graphene composite, such as 8%, 9%, 10%, 11%, 12%, 13%, 14%, 15%, 16%, 17% and 18% by weight of that of the polyaniline/graphene composite; most preferably, the graphene is about 11% by weight of that of the polyaniline/graphene composite (i.e., polyaniline/11% graphene composite). In other examples, the conductive polymer/carbon composite is polyaniline-co-indole/graphene composite, in which the graphene is about 6-20% by weight of that of the polyaniline-co-indole/graphene composite. In still other examples, the conductive polymer/carbon composite is polythiophene/graphene composite, in which the graphene is about 6-20% by weight of that of the polythiophene/graphene composite.

Suitable cathode material for use in the present invention may be any lithium cathode material, which includes, but is not limited to, lithium iron phosphate (LFP), lithium manganese phosphate (LMP), lithium cobalt oxide (LCO), lithium manganese oxide (LMO), lithium nickel oxide (LNO), lithium nickel manganese cobalt oxide (NMC), lithium nickel cobalt aluminum oxide (NCA) or lithium titanate (LTO) and etc. In one example, the cathode material is NMC; whereas in another example, the cathode is LCO.

According to various embodiments of the present disclosure, the artificial SEI cathode material contains no more than 5% by weight of the conductive polymer/carbon composite, such as no more than 4%, 3%, 2%, 1%, and 0.5% of the weight of the artificial SEI cathode material. In one example, the conductive polymer/carbon composite is no more than 2% (wt %) by weight of that of the artificial SEI cathode material. In another embodiment, the conductive polymer/carbon composite is no more than 1% (wt %) by weight of that of the artificial SEI cathode material. According to various embodiments of the present disclosure, a small quantity of the conductive polymer/carbon composite present in the cathode material would be enough to render a lithium battery comprising an electrode formed from the present artificial SEI cathode material with improved electrochemical properties, such as good charging and discharging performance, and long cycle lifetime.

In general, the artificial SEI cathode material of the present disclosure comprises in its structure, the lithium cathode material, and the conductive polymer/carbon composite of the present disclosure, which encapsulates at least a part of the lithium cathode material and function as a solid electrolyte interface (SEI) during the operation of the lithium battery to reduce the irreversible capacity of the cathode in the lithium battery.

To prepare an electrode of a rechargeable battery, the artificial SEI cathode material described above is mechanically mixed with a bonding agent, a conductive additive, and a solvent to produce a slurry. The slurry is then spread over the surface of copper or aluminum foil, pressed and cut into suitable size (such as 1 cm×1 cm) for use as a cathode. Similar preparation may also be used to prepare a control cathode. Throughout this specification, unless indicated to the contrary, the term "a control cathode" refers to a cathode material that is not encapsulated by the conductive polymer/carbon composite of the present invention. The terms "a control battery", "a control electrochemical cell" and "a control coin cell" are used interchangeably throughout the specification, and refers to a battery or a coin cell, in which the cathode is not encapsulated by the conductive polymer/carbon composite of the present invention. The bonding agent may be any of polyvinylidene fluoride (PVDF), carboxymethyl cellulose (CMC), styrene butadiene copolymer, and etc. The conductive additive may be carbon black (e.g., Super P carbon black), natural or synthetic graphite, soft carbon, hard carbon and etc.

The thus produced cathode is then assembled into a battery such as a lithium ion battery, which can be a coin cell battery or a cylinidrical battery, in argon filled environment, in according to procedures described in the examples of the present disclosure. As a control, an electrochemical cell including a control cathode is also fabricated.

In one preferred embodiment, a NMC lithium battery is provided. The NMC lithium battery has a cathode formed from the artificial SEI cathode material of the present disclosure, which comprises in its structure, a NMC cathode material encapsulated by a polyaniline/graphene composite, in which the polyaniline/graphene composite is no more than 2% by weight of that of artificial SEI cathode material, and the graphene is about 9% by weight of that of the polyaniline/graphene composite. The NMC based lithium secondary battery exhibits a reduced level of ESR, which is about half of the ESR value of the control cell (i.e., the electrochemical cell characterized in having a NMC cathode not encapsulated by the polyaniline/graphene composite). In a typical example, the NMC lithium battery has an ESR value of about 36 ohms, whereas the control battery has an ESR value of about 73 ohms. Accordingly, under the same charge and discharge condition, the ESR ratio between the NMC lithium ion battery and the control battery is smaller than 1, such as 0.9, 0.8, 0.7, 0.6, 0.5, 0.4, 0.3, 0.2 and 0.1; preferably smaller than 0.5, such as 0.4, 0.3, 0.2 and 0.1; more preferably, smaller than 0.3, such as 0.2 and 0.

Further, according to embodiments of the present disclosure, the current intensity ratio between the NMC lithium battery of the present invention and the control battery is great than 1, such as 1.05, 1.1, 1.15 and 1.2. In a typical example, the current intensity ratio between the NMC lithium battery of the present invention and the control battery is 1.08.

The artificial SEI cathode material of the present disclosure renders the NMC lithium battery a charge capacity in the range of 120-140 mAh/g and a discharge capacity in the range of 100-130 mAh/g at 0.5 C-3 C rate for the first cycle. Specifically, the NMC lithium secondary battery is capable of reaching 68% of its capacity when subjecting to charge at the rate of 5 C for about 9 minutes; and is capable of reaching 86% of its charge when subjecting to charge at the rate of 3 C for 20 minutes.

In another preferred embodiment of the present invention, a LCO lithium battery is provided. The LCO lithium battery has a cathode formed from the artificial SEI cathode material of the present disclosure, which comprises in its structure, a LCO cathode material encapsulated by a polyaniline/graphene composite of the present invention, in which the polyaniline/graphene composite is no more than 4% by weight of that of the artificial SEI cathode material, and the graphene is about 11% by weight of that of the polyaniline/graphene composite. The LCO based lithium ion battery exhibits a reduced level of ESR, which is about ⅓ to ½ of the ESR value of the control cell. In typical examples, the LCO lithium battery has an ESR value between 110 to 230 ohms, whereas the control cell has an ESR value of about 444 ohms. Accordingly, under the same charge and discharge condition, the ESR ratio between the LCO lithium battery of the present invention and a control battery is smaller than 1, such as 0.9, 0.8, 0.7, 0.6, 0.5, 0.4, 0.3, 0.2 and 0.1; preferably smaller than about 0.5, such as 0.4, 0.3, 0.2 and 0.1; more preferably smaller than about 0.3, such as 0.2 and 0.1.

Further, according to embodiments of the present disclosure, the current intensity ration between the LCO lithium battery of the present invention and the control LCO battery is great than 1, such as 1.1, 1.2, 1.3, 1.4, 1.5, 1.6, 1.7, 1.8, 1.9, and 2.0; preferably greater than 1.3, such as 1.4, 1.5, 1.6, 1.7, 1.8, 1.9, and 2.0; more preferably, greater than 1.5, such as 1.6, 1.7, 1.8, 1.9, and 2.0.

The artificial SEI cathode material renders the LCO lithium ion battery a charge capacity in the range of 100-130 mAh/g and a discharge capacity in the range of 106-130 mAh/g, respectively at 0.5 C-3 C rate for the first cycle. Specifically, the LCO battery is capable of reaching 96% charge capacity in about 64 min at the rate of 1 C, and 78% charge capacity in about 18 min at the rate of 3 C. According to some embodiments, at least 13% increase in discharge capacity at 3 C rate, and at least 60% increase in discharge capacity at 5 C rate were observed, respectively. The retention ratio of discharge capacity in the LCO lithium secondary battery also exhibits cycle stability in the range of 85-90% at the rate of 0.5 C after 50 cycles; as compared with that of a control battery.

The singular forms "a", "and", and "the" are used herein to include plural referents unless the context clearly dictates otherwise.

The present invention will now be described more specifically with reference to the following embodiments, which are provided for the purpose of demonstration rather than limitation.

EXAMPLES

Example 1 Production of Lithium Coin Cells 1.1 Preparation of Conductive Polymer/Graphene Composite 1.1.1 Production of Polyaniline Aniline (90 g. ACROS com.) was added into purified water (1,275 mL) with slow stirring under ice bath condition. The resulting mixture was stirred continuously for about 15 min, then HCl (150 g, Sigma-Aldrich com.) was added, and the stirring was continued for another 15 min before the addition of ammonium peroxodisulfate. The entire mixture was kept at 0° C. for about 1 hr, then at room temperature for about 24 hrs. The product was then filtered, washed with water, and dried, to give about 50 g of black polyaniline powder.

1.1.2 Production of Polyaniline/Graphene Composite

Aniline (90 g) and graphene (1.8 g, XFNANO com.) were added into purified water (1,275 mL) with slow stirring under ice bath condition. The resulting mixture was stirred continuously for about 15 min, then HCl (150 g) was added, and the stirring was continued for another 15 min before the addition of ammonium peroxydisulfate. The entire mixture was kept at 0° C. for about 1 hr, then at room temperature for about 24 hrs. The product was then filtered, washed with water, and dried, to give about 52 g of black polyaniline/graphene composite powder (i.e., PAN/9% Graphene composite).

1.1.3 Production of Polypyrrole/Graphene Composite

Pyrrole (20 g, ACROS com.) and graphene (0.4 g) were added into purified water (224 mL) with slow stirring under ice bath condition. The resulting mixture was stirred continuously for about 15 min, then HCl (21.72 g) was added, and the stirring was continued for another 15 min before the addition of ammonium peroxydisulfate to initiate polymerization. The entire mixture was kept at 0° C. for about 1 hr, then at room temperature for about 24 hrs. The product was then filtered, washed with water, and dried to produce about 18 g of black polypyrrole/graphene composite powder (i.e., Pyr/9% Graphene composite).

1.1.4 Production of Polyindole/Graphene Composite

In a flask containing ferric trichloride (34.45 g), slowly added therein about 70 mL chloroform, and the resulting mixture was stirred continuously for about 15 min. Dissolved indole (10 g) and graphene (0.2 g) in 50 mL chloroform. Slowly poured the indole/graphene chloroform solution into the flask containing the ferric trichloride chloroform solution to initiate polymerization, allowed the resulting mixture to react at 0° C. for about 15 min, then at room temperature for about 24 hrs. The product was then filtered, washed with water, and dried to produce about 8 g of black polyindole/graphene composite powder (i.e., Pin/9% Graphene composite)).

1.1.5 Production of Polyaniline-Indole Copolymer/Graphene Composite

In a flask containing chloroform, mixed therein aniline (90 g), indole (10 g) and graphene (1.8 g) under ice bath condition. The resulting mixture was stirred continuously for about 15 min, then added ferric trichloride to initiate polymerization. Allowed the reaction to proceed at 0° C. for about 1 hr, then at room temperature for about 24 hrs. The product was then filtered, washed with water, and dried to produce about 80 g of black polyaniline-indole copolymer/graphene composite powder (i.e., PANCoIn/9% Graphene composite)).

1.1.6 Production of Polyaniline-Pyrrole Copolymer/Graphene Composite

The Polyaniline-pyrrole copolymer/Graphene composite (i.e., PanCoPyr/9% Graphene composite) was produced in accordance with similar procedures as described in example 1.1.5, except water and ammonium peroxydisulfate was used as the solvent and the initiating agent respectively, and pyrrole (10 g) was added instead of indole.

1.1.7 Production of Polyaniline-Thiophene Copolymer/Graphene Composite

The Polyaniline-thiophene copolymer/Graphene composite (i.e., PANCoThio/9% Graphene) was produced in accordance with similar procedures as described in example 1.1.5, and thiophene (10 g) was added instead of indole.

1.2 Production of Cathode Material 1.2.1 Production of Lithium Nickel Manganese Cobalt Oxide (NMC)

In a container, mechanically mixed N-methylpyrrolidone (NMP) (UBIQ com) (24.4 g) and polyvinylidene fluoride (PVDF)-900 (0.8 g) for about 2.5 hrs, then added Super P (0.8 g) and $LiNi_{0.5}Mn_{0.3}Co_{0.2}O_2$ (NMC) (UBIQ com) (18 g). The resulting mixture was stirred continuously for another 2.5 hrs. Suitable amount of the product was spread on the surface of an alumina foil (UBIQ com.) to give a cathode materiel about 100 mm in thickness after heating at 80° C. for about 30 min. The cathode material was subject to further mangling until the thickness was reduced to about 80 mm. The thus produced cathode material was then sliced to about 1.0028 $cm^2$ in size each, which contained about 15.4 mg active material, with a density about 2.52 $g/cm^3$.

1.2.2 Production of Lithium Cobalt Oxide (LCO)

The LCO cathode material was prepared in accordance with similar procedures as described in example 1.2.1 except NMC was replaced by LCO (18.2 g), and the thus produced cathode material was sliced to about 1.0028 $cm^2$ in size each, which contained about 15.4 mg active material, with a density about 3.06 $g/cm^3$.

1.2.3 Production of the Artificial NMC Cathode Containing Conductive Polymer/Graphene Composite of Example 1.1

In general, the cathode of this example was prepared in accordance with the procedures as described in example 1.2.1 with further addition of the conductive polymer/graphene composites of examples 1.1.1, 1.1.2, 1.1.3, 1.1.4, 1.1.5, 1.1.6 and 1.1.7, in which the conductive polymer/graphene composites of example 1.1 was about 0.1-5% by weight of the thus produced NMC cathode material. Accordingly, 7 types of artificial SEI cathode were produced and are respectively termed NMC-PAN, NMC-PAN/Graphene, NMC-PPy/Graphene, NMC-PIN/Graphene, NMC-PANco-PIn/Graphene, NMC-PANcoPPy/Graphene, and NMC-PANcoThiophen/Graphene; in which graphene was no more than 25% by weight of that of the he conductive polymer/graphene composites.

1.2.4 Production of the Artificial LCO Cathode Containing Polyaniline/Graphene Composite of Example 1.1.2

In general, the cathode of this example was prepared in accordance with the procedures as described in example 1.2.2 with further addition of 1 to 2% of the polyaniline/graphene composites of examples 1.1.2. Accordingly, 3 types of artificial SEI cathodes were produced, and are respectively termed LCO-PAN/9% Graphene, LCO-PAN/11% Graphene, LCO-PAN/18% Graphene.

1.2.5 Production of the Artificial LCO Cathode Containing Polyaniline/Carbon Composite Aniline (2 g), LCO (94 g) and carbon material (e.g., graphene, nanotubes, fullerene and etc) (0.18 g, XFNANO com.) were added to purified water (1,275 mL) with slow stirring under ice bath condition. The resulting mixture was stirred continuously for about 15 min, then HCl (150 g) was added, and the stirring was continued for another 15 min before the addition of ammonium peroxydisulfate. The entire mixture was kept at 0° C. for about 1 hr, then at room temperature for about 24 hrs. The product was then filtered, washed with water, and dried, to give about 95.5 g of black LCO cathode with a layer of PAN/11% carbon composite coated thereon (in which the weight ratio of PAN:LCO was about 1:94, and the carbon material was no more than 25% by weight of that of the PAN/Carbon composite). Accordingly, the artificial LCO cathodes respectively having a PAN/Graphene composite, PAN/nanotube composite, and PAN/fullerene composite coated thereon were produced.

1.3 Coin Cell Assembly

The lithium coin cells (UBIQ com.) were assembled under argon environment using the cathode material as prepared in examples 1.2.3, 1.2.4 or 1.2.5; and the lithium metal as anode material, and a polypropylene film separator (Celgard A273) sandwiched between the electrodes. The separator was soaked with an electrolytic solution (SAMSUNG SDI com.) comprising ethylene carbonate (EC), propylene carbonate (PC), diethyl carbonate (DEC), dimethyl carbonate (DMC), lithium hexafluorophosphate ($LiPF_6$), and lithium hexafluoroarsenate ($LiAsF_6$).

Example 2 Electrochemical Evaluation of the Lithium Coin Cells Comprising NMC Cathode of Example 1.2.3

The coin cell of this example was constructed by using the NMC cathode of example 1.2.3 and the lithium metal as the anode material in accordance with the procedures as described in example 1.3. Unless otherwise indicated, the amount of PAN or PAN/graphene was 1% by weight of that of the NMC cathode of example 1.2.3 in this example. The thus produced coin cells were then subject to voltammetry (CV) test, and electrochemical impedance spectroscopy (EIS) analysis. A Randes-type half-cell circuit model as depicted in FIG. 1A was employed as an equivalent circuit, and the equivalent series resistance (ESR) including solution resistance (Rs), as well as capacitances for constant-phase element (CPE) were respectively measured and analysed using ZView™ software version 3.3c. CPE includes solid electrolyte interface resistance (Rsei), charge transfer resistance (Rct), and Warburg impedance ($W_o$).

2.1 Electrochemical Impedance Spectroscopy Analysis

The AC impedance spectrum of NMC coin cell of this example is illustrated in FIG. 1B, and ESR measurements are summarized in Table 1.

Referring to FIG. 1B, which is a Nyquist pot of the NMC coin cell of example 1.3, in which the NMC cathode is encapsulated by the polyaniline of example 1.1.1 (NMC-PAN, curve 102), or the polyaniline/graphene composite of example 1.1.2 (NMC-PAN/9% Graphene, curve 104). A control coin cell having NMC cathode material without any addition of PAN or PAN/Graphene (curve 100) was also tested. As evidenced from FIG. 1B, the impedance of curve 104 is much smaller than that of the control (curve 100); whereas curve 102 exhibited much higher impedances as compared to the control curve 100.

The ESR measurements summarizes in Table 1 indicate that the NMC cathode comprising the polyaniline of example 1.1.1 exhibited slightly reduced series resistance, in which smaller $R_s$ and $R1_{sei}$ were found as compared with those of the control cell. By contrast, significant reduction in series resistance was observed when the cathode was encapsulated with the polyaniline/graphene composite of example 1.1.2. Accordingly, the ESR ratio of the NMC coin cell of the present disclosure (i.e., cells having the cathode material comprising PAN or PAN/9% Graphene) and that of the control coin cell is smaller than 1.

TABLE 1

ESR Measurements of NMC Coin Cell Comprising Cathode Material of Example 1.1

|  | NMC | NMC-PAN | NMC-PAN/ 9% Graphene |
|---|---|---|---|
| Rs (ohm) | 21.24 | 10.47 | 18.53 |
| CPE1 |  |  |  |
| CPE1-T (F) | 7.87E−06 | 1.08E−06 | 7.85E−06 |
| CPE1-P | 0.865 | 1.000 | 0.893 |
| $R1_{sei}$ (ohm) | 29.73 | 20.00 | 6.82 |
| CPE2 |  |  |  |
| CPE2-T (F) | 0.0144 | 2.48E−05 | 0.01542 |
| CPE2-P | 0.430 | 0.789 | 0.356 |
| Rct (ohm) | 22.15 | 41.65 | 10.70 |
| $W_0$-R (ohm) | 1699 | 808 | 840 |
| $W_0$-T | 1.722 | 1.590 | 1.856 |
| $W_0$-P | 0.976 | 0.989 | 0.963 |
| ESR (Rs + $R1_{sei}$ + Rct) (ohm) | 73.12 | 72.12 | 36.05 |
| ESR Ratio | 1.00 | 0.986 | 0.493 |

Note:
The equivalent circuit was modelled by ZView ™ software version 3.3c supplied by Scribner Associates Inc. company. Capacitances for constant-phase element (CPE), in which T and P are the CPE parameters of the equation $Z = 1/[T(i * w)^P]$ used to fit the depressed semicircle of the Nyquist plot. The $W_0$-T is the Warburg coefficient, the $W_0$-R is Z' at very low frequency and the $W_0$-P is an exponent. All the parameters from Zview ™ software have less than 10% of error.

2.2 Cyclic Voltammetry (CV) Test

In the CV test, the electrode potential was ramped at a rate of 0.05 mV/sec from 3.0 to 4.2 V so as to obtained information relating to the redox potential of the cathode material. The data was summarized in Table 2; and plotted as current v. potential in FIG. 2.

Referring to FIG. 2, in which data were depicted for coin cell having NMC cathode material comprising PAN (NMC-PAN, curve 202), and PAN/9% Graphene (NMC-PAN/9% Graphene, curve 204). A control coin cell having NMC cathode material without any addition of PAN or PAN/Graphene (curve 200) was also tested. It is noted that the peak current intensity during oxidation reaction for the coin cell having NMC cathode material encapsulating with the PAN/graphene composite of example 1.1.2 increased about 18% (1.73 mA vs 1.46 mA, curve 204 in FIG. 2), as compared to that of the control cell (curve 200 in FIG. 2). Accordingly, the ratio of the total current of the NMC cell comprising NMC cathode material encapsulating by the polyaniline/graphene composite of example 1.1.2 to that of the control NMC cell is greater than 1.

TABLE 2

Summary of the data collected during CV test for the NMC coin cells of example 1.4.

| Cathode Material | Differences in redox potential (ΔV) | Charging current, $I_c$ (mA) | Discharging current, $I_{dis}$ (mA) | ΔV Ratio as compared to the control cell | Current Ratio as compared to control cell |
|---|---|---|---|---|---|
| NMC Control | 0.28 | 1.5 | 1.1 | 1 | 1 |
| NMC - PAN | 0.27 | 1.4 | 1.0 | 0.96 | 0.92 |
| NMC - PAN/9% Graphene | 0.2 | 1.7 | 1.1 | 0.71 | 1.08 |

The NMC coin cells of example 1.4 were also subject to charge and discharge test at various C rates. Specifically, the cells were charged at a rate of 0.5 C to 3 C until 4.2V, in which the cutoff current was set at 0.9 mA and discharged at 0.5 C until 3V. The charge and discharge profiles are respectively illustrated in FIGS. 3 and 4; and the capacitance data is summarized in Tables 3 and 4.

Figure 3A:
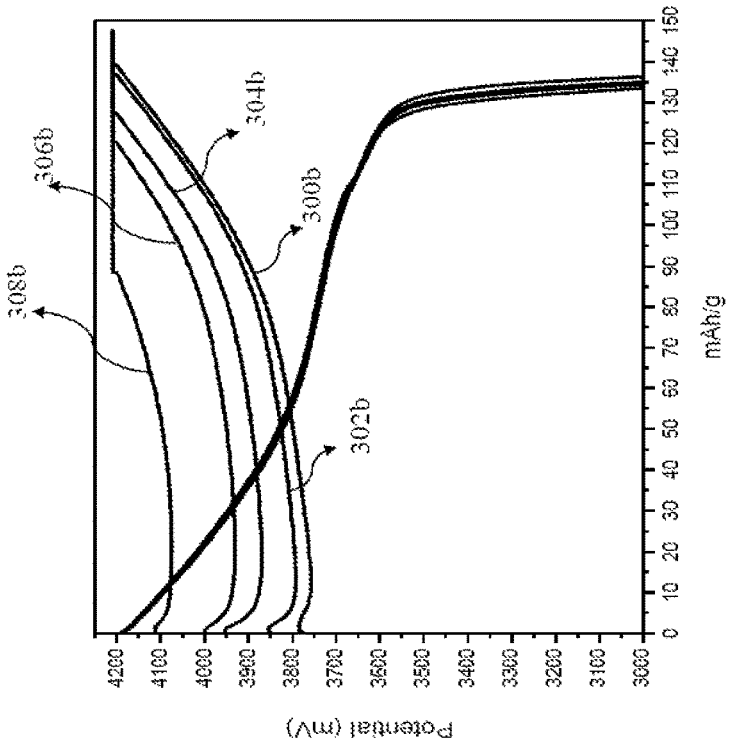
FIGS. 3A and 3B are plots of charging profiles of (A) the control NMC coin cell, and (B) NMC coin cell comprising the conductive polymer/graphene composite of example 1.1 respectively at 0.5 C, 1 C, 2 C and 3 C rates in accordance with one embodiment of the present disclosure.
Figure 3B:
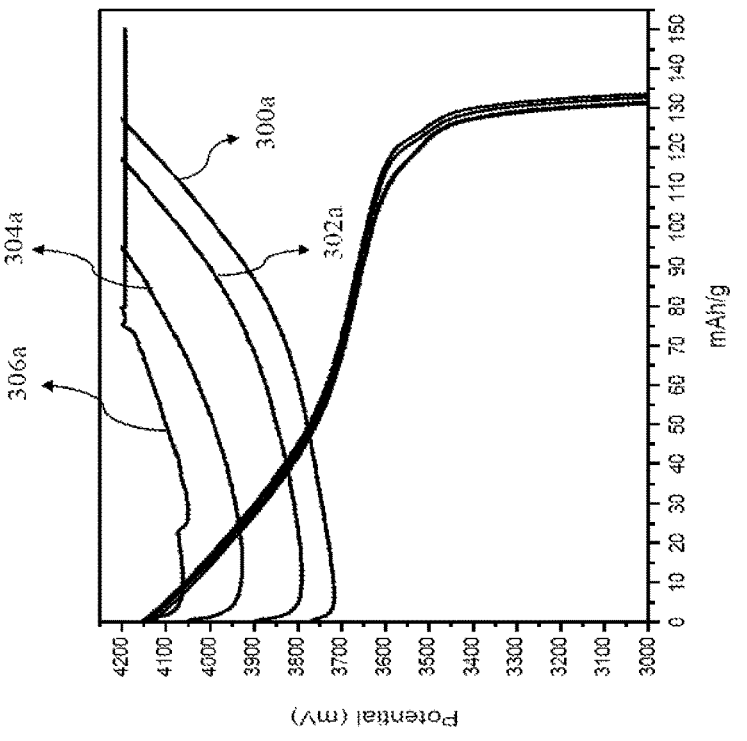

Referring to FIGS. 3A and 3B, in which charge profiles of the control NMC cell and the cell comprising NMC-PAN/9% Graphene cathode material charged at a rate of 0.5 C (curves 300a, 300b), 1 C (curves 302a, 302b), 2 C (curves 304a, 304b), 3 C (curves 306a, 306b) and 5 C (curve 308b) are depicted, respectively. It was noted that the coin cell comprising NMC-PAN/9% Graphene cathode material can be charged at a rate of 5 C (curve 308b), while the control cell could only reach the rate of 3 C (curve 306a). Further according to the capacitance data summarized in Table 3, higher capacitance was maintained up to the charge rate of 5 C for coin cell comprising NMC-PAN/9% Graphene cathode material, in which the cell reached 68% of its capacity in 9 min at the rate of 5 C, and 86% in 20 min at the rate of 3 C.

FIGS. 4A and 4B depict the discharge profiles of the control NMC cell and the cell comprising NMC-PAN/9% Graphene cathode material charged at a rate of 0.2 C (curves 400a, 400b), 0.5 (curves 402a, 402b), 1 C (curves 404a, 404b), 2 C (curves 406a, 406b), 3 C (curves 408a, 408b), and 5 C (curves 4108a, 410b) respectively. It was noted that initial voltages of the coin cell comprising NMC-PAN/9% Graphene cathode material discharged at rates between 0.5 C to 5 C all maintained at a relatively similar level above 3.95V. Further according to the capacitance data summarized in Table 4, the capacitance of the coin cell comprising NMC-PAN/9% Graphene cathode material increased for about 13% at the discharge rate of 5 C, while the initial voltage declined slightly for about 6%.

TABLE 3

The Capacitance of Lithium coin cell comprising NMC cathode with or without encapsulating with PAN/9% Graphene composite at various charge rates

| | Capacitance at Various Charge Rates (mAh/g) | | | | |
|---|---|---|---|---|---|
| | 0.5 C | 1 C | 2 C | 3 C | 5 C |
| NMC | 127.4 | 117.2 | 95.1 | 79.7 | — |
| NMC - PAN/9% Graphene | 139.1 | 136.8 | 127.2 | 120.2 | 88.5 |

TABLE 4

The Capacitance of Lithium coin cell comprising NMC cathode with or without encapsulating with PAN/9% Graphene composite at various discharge rate

| | Capacitance at Various Discharge Rates (mAh/g) | | | | |
|---|---|---|---|---|---|
| | 0.5 C | 1 C | 2 C | 3 C | 5 C |
| NMC | 127 | 123 | 116 | 105 | 61 |
| NMC-PAN/9% Graphene | 128 | 123 | 113 | 100 | 69 |

Taken together the data presented above in this example, it is clear that encapsulating the NMC cathode material with the polyaniline/graphene composite of example 1.1.2 improved the electrode chemical performance of the thus produced lithium cell, including a reduction in series resistance, good charging and discharging performance and enhanced electric capacity.

Example 3 Electrochemical Evaluation of the Lithium Coin Cells Comprising LCO Cathode of Example 1.2.4

In this example, lithium coin cells comprising LCO cathode of example 1.2.4 were subject to similar test as described in Example 2, including electrochemical impedance analysis, voltammetry (CV) test, and effective series resistance (ESR) measurement using the Randes-type circuit model as depicted in FIG. 1A. Similarly, unless otherwise indicated, the amount of PAN or PAN/Graphene in the LCO cathode of example 1.2.4 was 1% by weight.

3.1 Electrochemical Impedance Analysis

Figure 5:
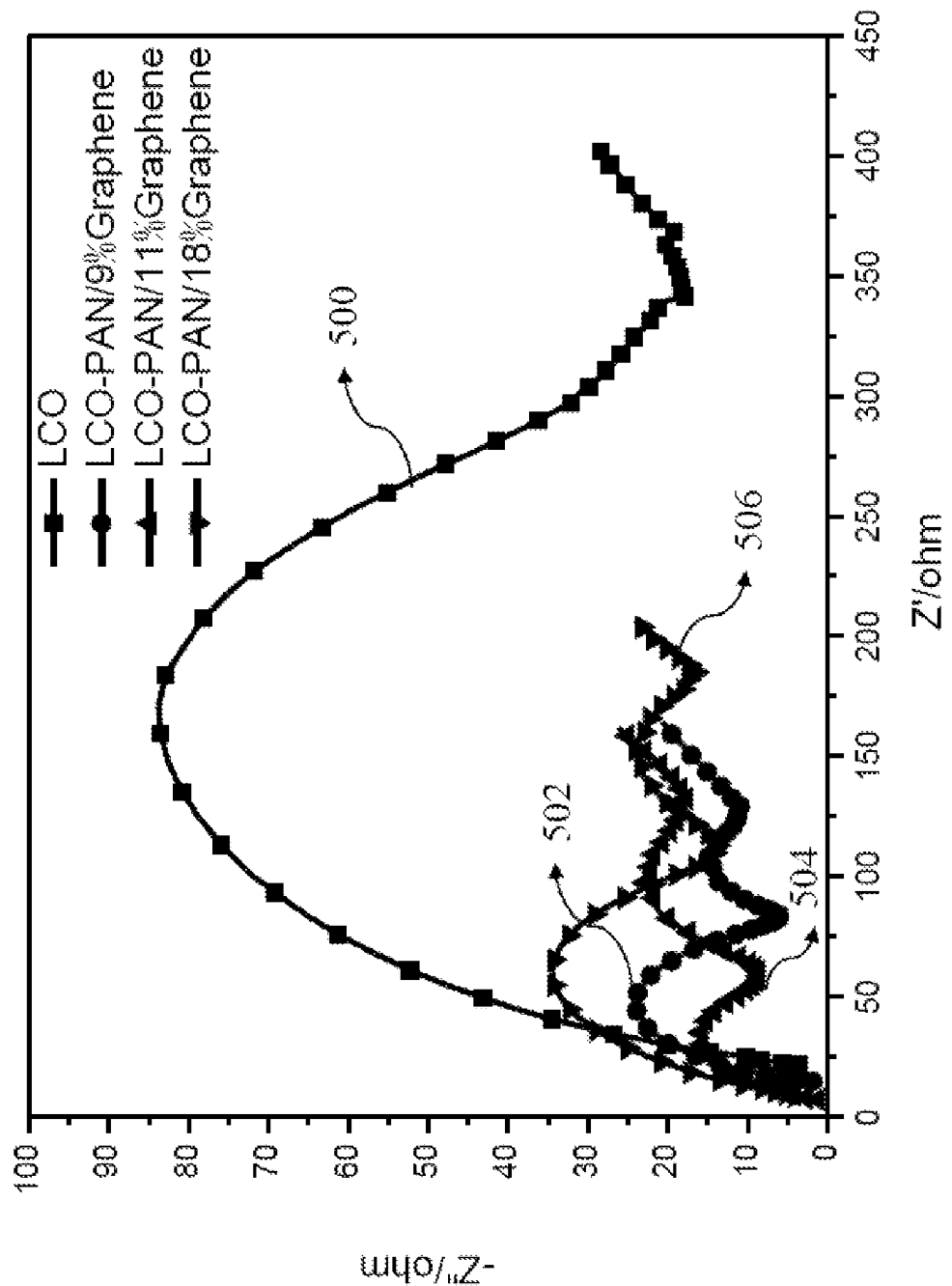
FIG. 5 are Nyquist plots of LCO coin cells respectively illustrating the AC impedance spectrums of LCO cathode encapsulated by the polyaniline/8-18% graphene composite of example 1.1.2 in accordance with one embodiment of the present invention.

The AC impedance spectrum of LCO coin cell of this example is illustrated in FIG. 5, and ESR measurements are summarized in Table 5.

Referring to FIG. 5, which is a Nyquist pot of a LCO coin cell, in which the LCO cathode material is encapsulated by PAN/9% Graphene (curve 502), PAN/11% Graphene (curve 504), or PAN/18% Graphene (curve 506). A control coin cell having LCO cathode material without any addition of PAN/graphene composite (curve 500) was also tested. As evidenced from FIG. 5, the impedance curves 502, 504, and 506, all exhibited much smaller impedances as compared to curve 500; among them, curve 504 exhibited the smallest impedance. The results indicate that encapsulating LCO cathode material with the polyaniline/graphene composite of example 1.1.2 may successfully reduce the impedance of the electrode, which is further confirmed by ESR measurement.

The ESR measurements summarized in Table 5 indicate that the LCO cathode comprising the polyaniline/graphene composite of example 1.1.2 all exhibited significant reduced levels of series resistance, in which smaller $R_s$ and $R_{1sei}$ were found as compared with those of the control cell. Accordingly, the ESR ratio of the LCO coin cell of the present disclosure (i.e., cells having the cathode material comprising PAN/Graphene composite) and that of the control coin cell is much smaller than 1.

TABLE 5

ESR Measurements of LCO Coin Cell Comprising Cathode Material of Example 1.2.4

| | LCO | LCO - PAN/ 9% Graphene | LCO - PAN/11% Graphene | LCO - PAN/18% Graphene |
|---|---|---|---|---|
| Rs (ohm) | 19.67 | 14.27 | 6.632 | 3.922 |
| CPE1 | | | | |
| CPE1-T (F) | 1.27E-05 | 6.85E-06 | 3.12E-05 | 1.51E-05 |
| CPE1-P | 0.728 | 0.808 | 0.704 | 0.772 |
| $R_{1sei}$ (ohm) | 277.2 | 66.82 | 51.33 | 89.79 |
| CPE2 | | | | |
| CPE2-T(F) | 0.0174 | 0.00312 | 0.00310 | 0.0137 |
| CPE2-P | 0.283 | 0.762 | 0.687 | 0.202 |
| Rct (ohm) | 148.0 | 28.41 | 66.31 | 137.4 |
| $W_0$-R (ohm) | 0.03374 | 0.2940 | 0.05121 | 29150 |
| $W_0$-T | 1.00E-20 | 3.52E-08 | 4.50E-08 | 1.82 |
| $W_0$-P | 0.03 | 0.128 | 0.172 | 0.0997 |
| ESR (Rs + $R1_{sei}$ + Rct) (ohm) | 444.77 | 109.5 | 124.272 | 231.112 |
| ESR Ratio | 1 | 0.246 | 0.279 | 0.520 |

Note:
The equivalent circuit was modelled by ZView™ software version 3.3c supplied by Scribner Associates Inc. company. Capacitances for constant-phase element (CPE), in which T and P are the CPE parameters of the equation $Z = 1/[T(i * w)^P]$ used to fit the depressed semicircle of the Nyquist plot. The $W_0$-T is the Warburg coefficient, the $W_0$-R is Z' at very low frequency and the $W_0$-P is an exponent. All the parameters from Zview™ software have less than 10% of error.

3.2 Cyclic Voltammetry (CV) Test

In the CV test, the electrode potential was ramped at a rate of 0.05 mV/sec from 3.0 to 4.2 V so that information about the redox potential of the cathode material were obtained. The data was summarized in Table 6; and plotted as current v. potential in FIG. 6.

Figure 6:
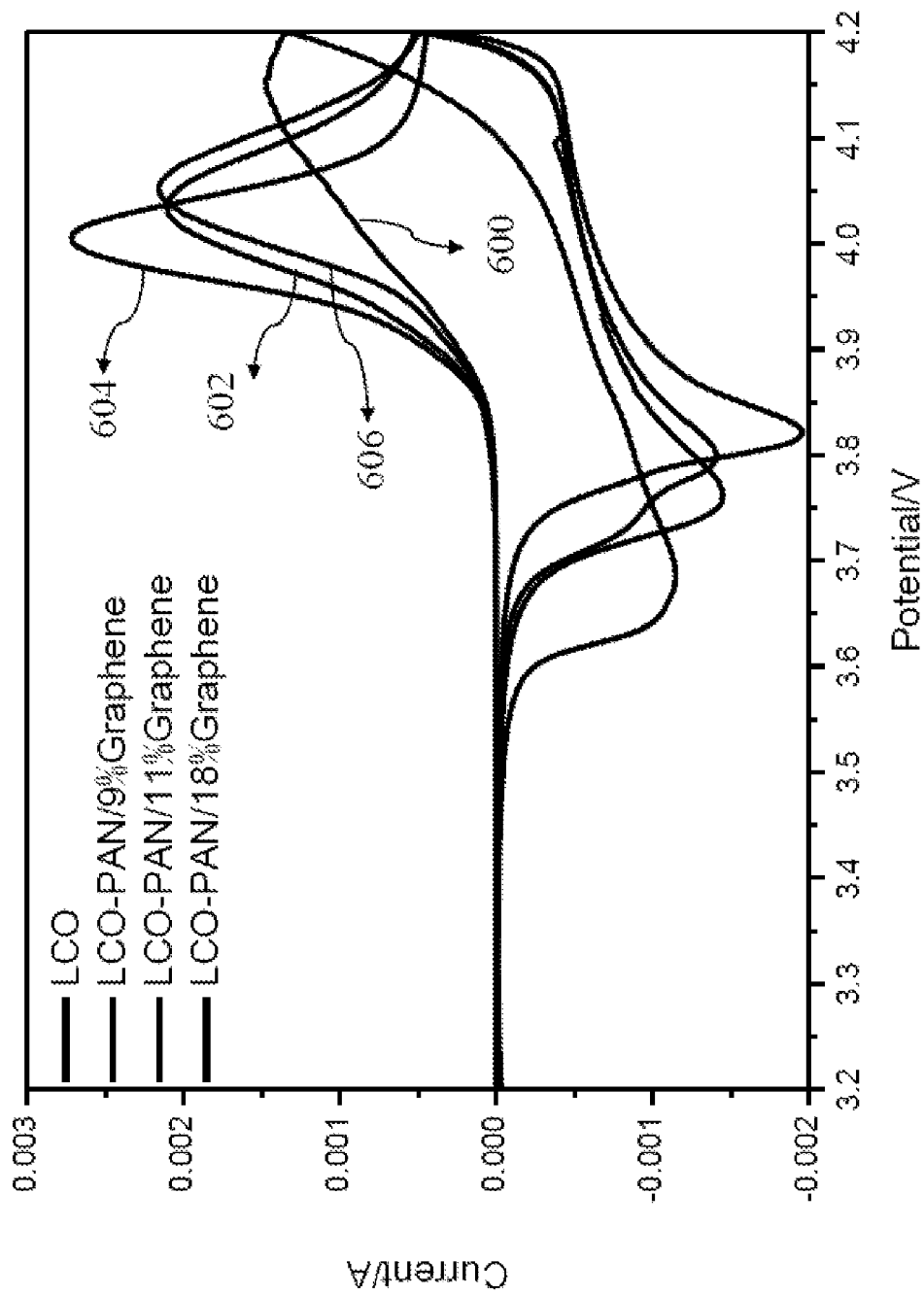
FIG. 6 are the cyclic voltammetry plots for LCO coin cells respectively comprising the polyaniline/9-18% graphene composite of example 1.1.2 in accordance with one embodiment of the present disclosure.

Referring to FIG. 6, in which data are depicted for coin cell having LCO cathode material comprising the PAN/Graphene composite of example 1.1.2, in which curves 602, 604, and 606 respectively represent data collected from LCO cathodes comprising 9%, 11% and 18% Graphene in the PAN/Graphene composites. A control coin cell having LCO cathode material without any addition of PAN/graphene composite (curve 600) was also tested. It is noted that the coin cell having LCO cathode material respectively encapsulating with PAN/9-18% Graphene composites all exhibited enhanced peak current intensities during the oxidation-reduction reactions (see curves 602, 604, and 606), as compared to that of the control cell (curve 600 in FIG. 6). Accordingly, the ratio of the total current of each LCO cells comprising LCO cathode material encapsulating with polyaniline/graphene composite of example 1.1.2 to that of the control NMC cell is greater than 1.

TABLE 6

Summary of the data collected during CV test for the LCO coin cells of example 1.4.

| Cathode Material | Differences in redox potential (ΔV) | Charging current, $I_c$ (mA) | Discharging current, $I_{dis}$ (mA) | ΔV Ratio as compared to the control | Current Ratio as compared to control cell |
|---|---|---|---|---|---|
| LCO Control | 0.5 | 1.4 | 1.2 | 1 | 1 |

TABLE 6-continued

Summary of the data collected during CV test for the LCO coin cells of example 1.4.

| Cathode Material | Differences in redox potential (ΔV) | Charging current, $I_c$ (mA) | Discharging current, $I_{dis}$ (mA) | ΔV Ratio as compared to the control | Current Ratio as compared to control cell |
|---|---|---|---|---|---|
| LCO-PAN/9% Graphene | 0.25 | 2.1 | 1.4 | 0.5 | 1.35 |
| LCO-PAN/11% Graphene | 0.15 | 2.7 | 1.95 | 0.3 | 1.81 |
| LCO-PAN/18% Graphene | 0.25 | 2.15 | 1.4 | 0.5 | 1.365 |

The LCO coin cells of example 1.4 were also subject to charge and discharge test at various C rates. Specifically, the cells were charged at a rate of 0.5 C to 3 C until 4.2V, in which the cutoff current was set at 0.09 mA; and discharged at 0.5 C until 3V. The charge and discharge profiles are respectively illustrated in FIGS. 7 and 8; and the capacitance data is summarized in Tables 7 and 8.

Referring to FIGS. 7A and 7B, in which charge profiles of the control LCO cell and the LCO cell comprising PAN/8-18% Graphene cathode material charged at a rate of 0.5 C (curves 700a, 700b), 1 C (curves 702a, 702b), 2 C (curve 704b), and 3 C (curve 706b) are depicted, respectively. According to the capacitance data summarized in Table 7, higher capacitance was maintained for LCO coin cell comprising PAN/11% Graphene cathode material, in which the LCO cell reached 96% of its capacity in 64 min at the rate of 1 C, and 78% of its capacity in 18 min at the rate of 3 C.

FIGS. 8A and 8B depict the discharge profiles of the control LCO cell and the LCO cell comprising the artificial LCO cathode material of example 1.2.4 or 1.2.5, in which the amount of the PAN/Graphene composite was about 1-2% of the weight of the artificial LCO cathode, and the amount of graphene in the PAN/Graphene composite was between 9-18% by weight. Specifically, LCO cathode material discharged at a rate of 0.5 C (curves 800a, 800b), 1 C (curves 802a, 802b), 2 C (curves 804a, 804b), 3 C (curves 806a, 806b) and 5 C (curve 808a, 808b), are respectively depicted. It was noted that the discharge capacitances of the coin cells comprising LCO cathode encapsulated with PAN/11% Graphene or PAN/18% Graphene increased about 13-14% at the discharge rate of 3 C, as compared with those of the control cells. Similarly, about 60% increase in the discharge capacitance was observed for coin cell comprising LCO cathode encapsulated with PAN/11% Graphene or PAN/18% Graphene at the discharge rate of 5 C.

TABLE 7

The Capacitance of Lithium coin cell comprising LCO cathode with or without encapsulating with PAN/Graphene composite at various charge rates

| | Capacitance at Various Charge Rates (mAh/g) | | | |
|---|---|---|---|---|
| | 0.5 C | 1 C | 2 C | 3 C |
| LCO | 122.7 | 98.3 | — | — |
| LCO - PAN/9% Graphene | 132.5 | 115 | 105.4 | — |
| LCO - PAN/11% Graphene | 126.2 | 121.4 | 114.1 | 102.6 |
| LCO - PAN/18% Graphene | 125.5 | 118 | 95.2 | — |

TABLE 8

The Capacitance of Lithium coin cell comprising LCO cathode with or without encapsulating with PAN/Graphene composite at various discharge rate

| | Capacitance at Various Discharge Rates (mAh/g) | | | | | % increase over 3 C | % increase over 5 C |
|---|---|---|---|---|---|---|---|
| | 0.5 C | 1 C | 2 C | 3 C | 5 C | | |
| LCO | 127 | 124.7 | 120.7 | 107.6 | 66.8 | 1 | 1 |
| LCO - PAN/11% Graphene | 128 | 128.1 | 125.7 | 122.5 | 108.1 | 1.14 | 1.62 |
| LCO - PAN/18% Graphene | 126.5 | 126.9 | 124.4 | 121.8 | 106 | 1.13 | 1.59 |

3.3 Cycle Life Test

The discharge capacitance of the LCO coin cells of example 1.4 were further subject to cycle life test. The test was performed by charging the test cells respectively at cut-off voltage of 4.2 V and 4.5V continuously for at least 50 cycles. Results are depicted in FIGS. 9 to 11.

Figure 9:
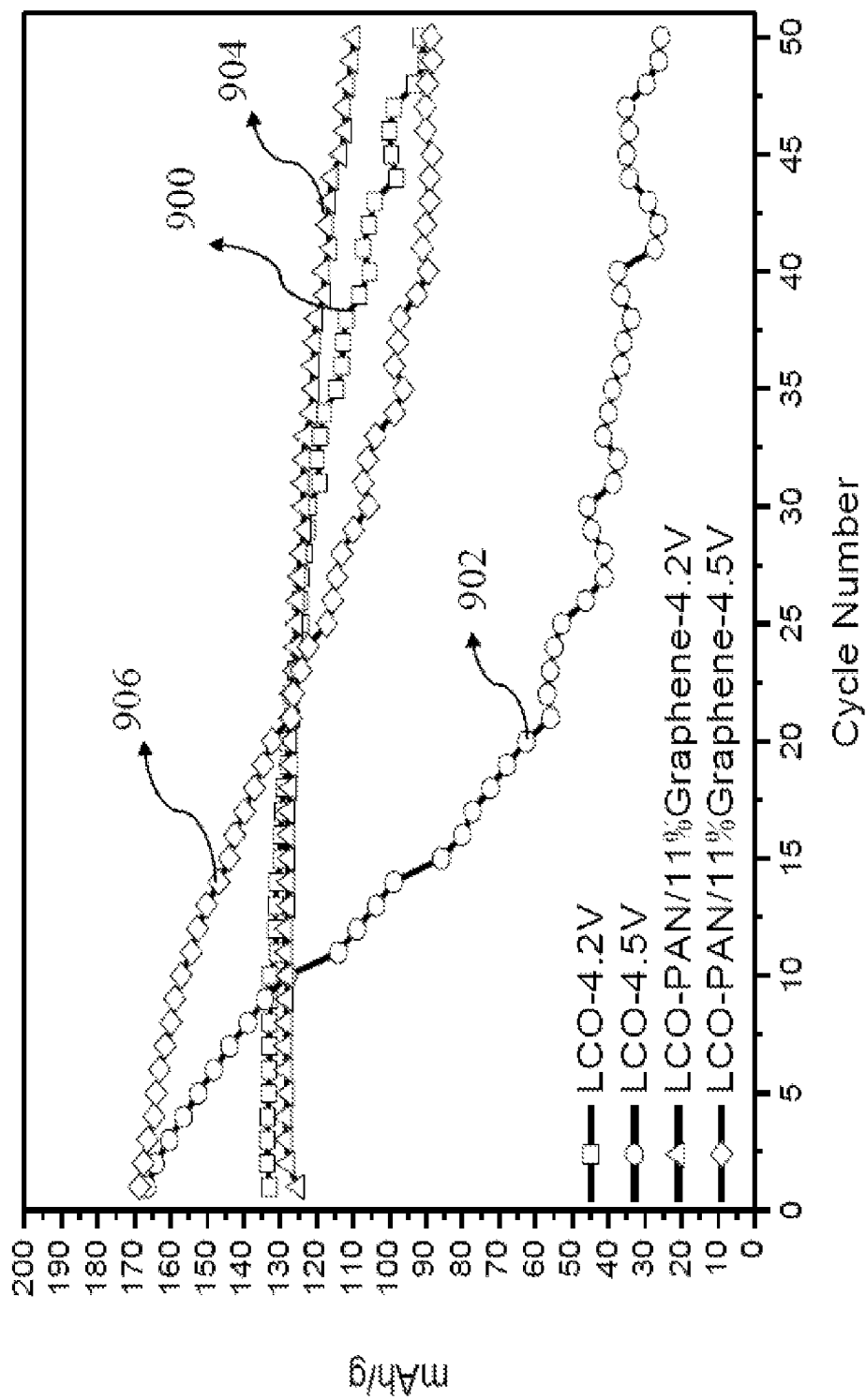
FIG. 9 is a plot of the life cycle versus capacitance of (A) the control LCO coin cell, and (B) the LCO cells comprising polyaniline/11% graphene composite of example 1.1.2, respectively at 4.2 and 4.5 Volts in accordance with one embodiment of the present disclosure.

Referring to FIG. 9, the discharge capacitance of the control cells decreased gradually as the number of cycles increased at the charging cut-off voltage at 4.2V (curve 900); however, as the charging cut-off voltage increased to 4.5 V, the discharge capacitance dropped significantly above the $10^{th}$ cycle (curve 902). By contrast, relatively more stable discharge capacitance was observed for the LCO cell comprising 1% PAN/11% Graphene composite of example 1.1.2 throughout the life cycle test, either at 4.2 V or at 4.5 V, with only a slight drop in the capacitance above 50 cycles (curves 904, 906).

Figure 10:
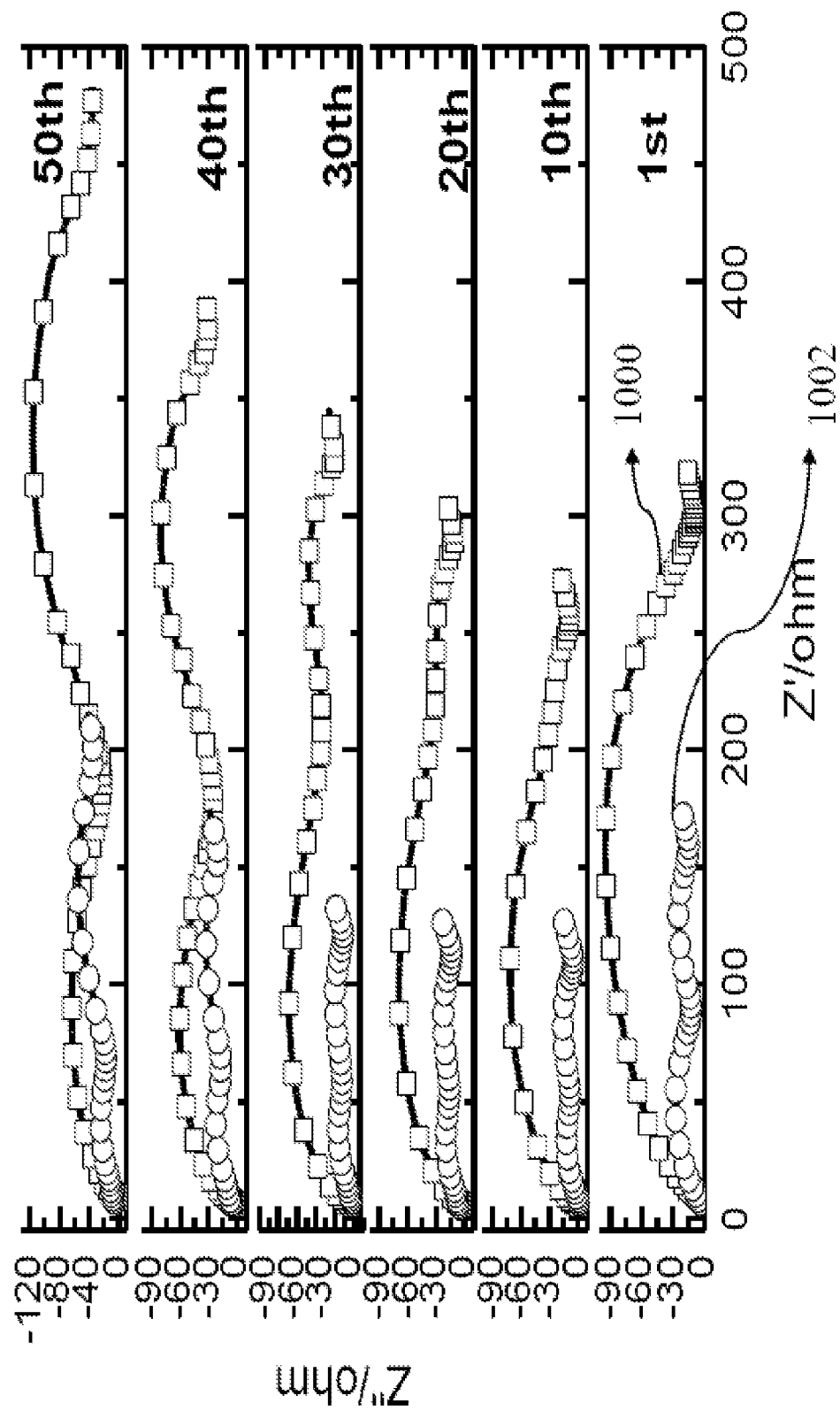
FIG. 10 are Nyquist plots illustrating AC impedance spectrums of the control LCO coin cell (curve 1000) and the LCO cells comprising polyaniline/11% graphene composite of example 1.1.2 (curve 1002) at 4.2V in the 1st, $10^{th}$, $20^{th}$, $30^{th}$, $40^{th}$ and $50^{th}$ cycles in accordance with one embodiment of the present disclosure.
Figure 11:
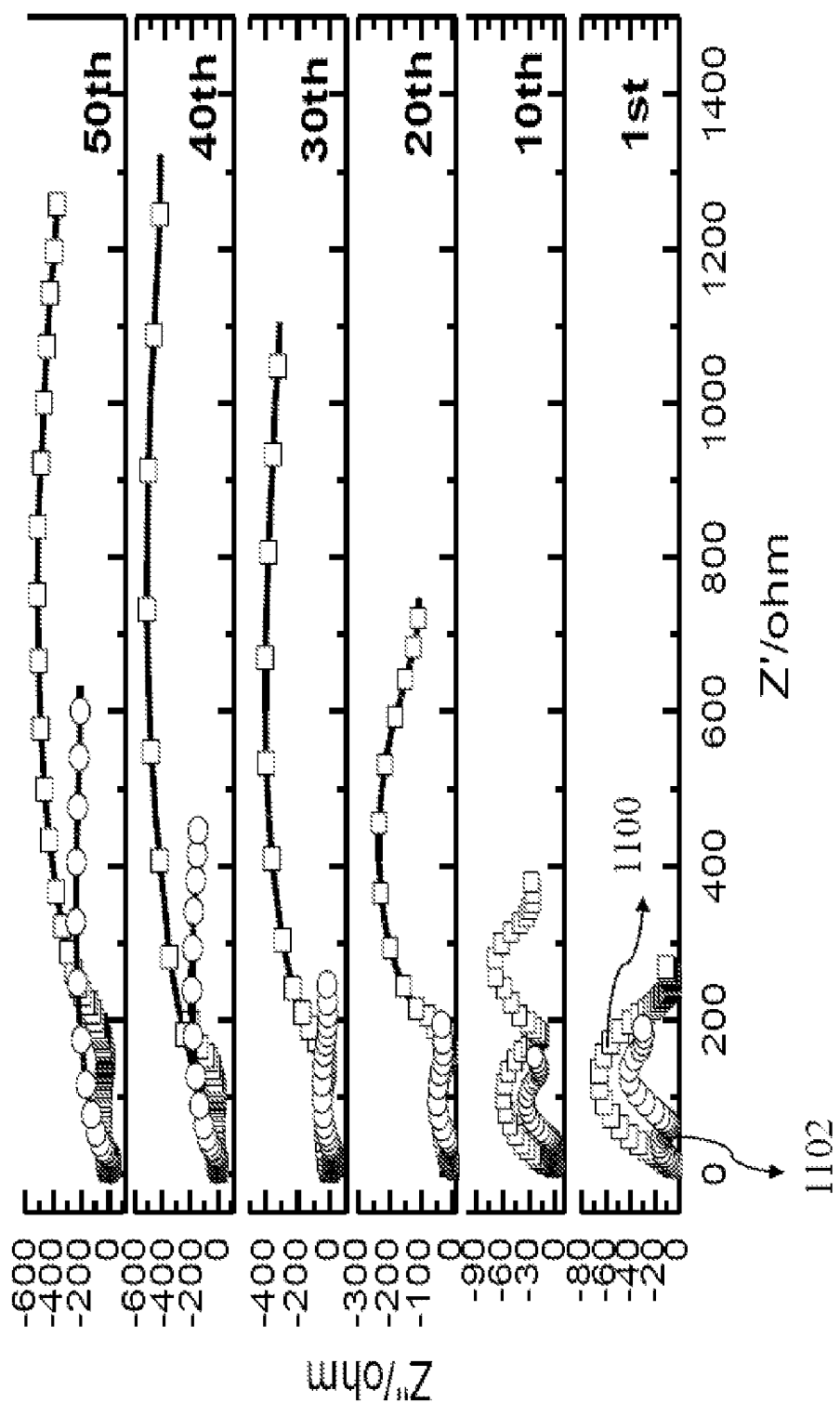
FIG. 11 are Nyquist plots illustrating AC impedance spectrums of the control LCO coin cell (curve 1100) and the LCO cells comprising polyaniline/11% graphene composite of example 1.1.2 (curve 1102) at 4.5V in the 1st, $10^{th}$, $20^{th}$, $30^{th}$ $40^{th}$ and $50^{th}$ cycles in accordance with one embodiment of the present disclosure.

FIG. 10 are AC impedance spectrums for the control LCO cell and LCO cell of example 1.4 (in which the LCO cathode material was encapsulated by PAN/11% graphene composite) respectively being discharged for 1, 10, 20, 30, 40 and 50 times at the charging cut-off voltage of 4.2 V.

Referring to FIG. 10, the AC impedance spectrums respectively obtained at the first, $10^{th}$, $20^{th}$, $30^{th}$, $40^{th}$ and $50^{th}$ cycles are depicted. With the addition of PAN/11% graphene composite of example 1.1.2 in the LCO cathode material, the test LCO cell exhibited a much lower impedance in the first cycle (curve 1002, represented by symbols "○") as compared to that of the control cell (curve 1000, represented by symbols "□"). As the number of cycles increased, the impedance of the control LCO cells increased significantly, whereas the LCO cells of the present disclosure maintained at a relatively low level up to the $30^{th}$ cycle. Similar results were also found when LCO cells were charged and discharged at 4.5 V (FIG. 11), in which curve 1100 represents data collected by the control cell, whereas curve 1102 represents data collected by cells comprising LCO cathode material encapsulated by PAN/11% graphene composite.

Taken together, it is clear that encapsulating the LCO cathode material with the conductive polymer/carbon material composite of example 1, particularly the PAN/graphene composite of example 1.1.2 may improve the electrode chemical performance of the thus produced lithium cell, including a reduction in series resistance, good charging and discharging performance, enhanced electric capacity and cycle life.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. An artificial solid electrolyte interface (SEI) cathode material for use in a secondary battery, comprising:
   a cathode material selected from the group consisting of lithium iron phosphate (LFP), lithium manganese phosphate (LMP), lithium cobalt oxide (LCO), lithium manganese oxide (LMO), lithium nickel oxide (LNO), lithium nickel manganese cobalt oxide (NMC), lithium nickel cobalt aluminum oxide (NCA) and lithium titanate (LTO); and
   a conductive polymer/graphene composite encapsulating at least part of the cathode material for forming an artificial SET around the cathode of the secondary battery;
   wherein, the conductive polymer/graphene composite is consisting of a conductive polymer and graphene, in which the graphene is no more than 25% by weight of that of the conductive polymer/graphene composite; the conductive polymer/graphene composite is no more than 5% by weight of that of the artificial SET cathode material; and the conductive polymer is selected from the group consisting of polyaniline, polypyrrole, polyindole, polythiophene, polycarbozole, polyazepines, polyfluorene, polyphenylenes, and a combination thereof.

2. The artificial SET cathode material of claim 1, wherein the conductive polymer/graphene composite is no more than 2% by weight of that of the artificial SEI cathode material.

3. The artificial SEI cathode material of claim 2, wherein the conductive polymer/graphene composite is no more than 1% by weight of that of the artificial SEI cathode material.

4. The artificial SEI cathode material of claim 1, wherein the conductive polymer/graphene composite is consisted of polyaniline and graphene.

5. The artificial SEI cathode material of claim 4, wherein the cathode material is NMC.

6. The artificial SEI cathode material of claim 4, wherein the cathode material is LCO.

7. The artificial SEI cathode material of claim 5, wherein the artificial SEI cathode material reaches 86% charging capacity in about 20 min at the rate of 3 C; and 68% charging capacity in about 9 minutes at the rate of 5 C.

8. The artificial SEI cathode material of claim 6, wherein the artificial SEI cathode material reaches 96% charge capacity in about 64 min at the rate of 1 C, and 78% charge capacity in about 18 min at the rate of 3 C.

9. The artificial SEI cathode material of claim 8, wherein the artificial SEI cathode material exhibits cycling stability in the range of 85-90% at 0.5 C rate after discharging between 3-4.2 V for 50 cycles.

10. A lithium secondary battery comprising,
    a cathode formed from an artificial solid electrolyte interface (SEI) cathode material, which comprises:
        a cathode material selected from the group consisting of lithium iron phosphate (LFP), lithium manganese phosphate (LMP), lithium cobalt oxide (LCO), lithium manganese oxide (LMO), lithium nickel oxide (LNO), lithium nickel manganese cobalt oxide (NMC), lithium nickel cobalt aluminum oxide (NCA) and lithium titanate (LTO); and
        a conductive polymer/graphene composite encapsulating at least a part of the cathode material for forming an artificial solid electrolyte interface (SEI) in the secondary battery;
    wherein, the conductive polymer/graphene composite is consisting of a conductive polymer and graphene, in which the graphene is no more than 25% by weight of that of the conductive polymer/graphene composite; and the conductive polymer/graphene composite is no more than 5% by weight of that of the artificial SEI cathode material; and the conductive polymer is selected from the group consisting of polyaniline, polypyrrole, polyindole, polythiophene, polycarbozole, polyazepines, polyfluorene, polyphenylenes, and a combination thereof;
    an anode;
    wherein, under the same charge and discharge condition, the ratio of the equivalent series resistance (ESR) of the lithium secondary battery to that of a control battery is lower than 1; the ratio of the current intensity of the lithium secondary battery to that of the control battery is greater than 1; and the control battery is characterized in that its cathode is not encapsulated by the conductive polymer/graphene composite.

11. The lithium secondary battery of claim 10, wherein the conductive polymer/graphene composite is no more than 2% by weight of that of the artificial SEI cathode material.

12. The lithium secondary battery of claim 11, wherein the conductive polymer/graphene composite is no more than 1% by weight of that of the artificial SEI cathode material.

13. The lithium secondary battery of claim 10, wherein the conductive polymer/graphene composite is consisted of polyaniline and graphene.

14. The lithium secondary battery of claim 13, wherein the cathode material is NMC.

15. The lithium secondary battery of claim 13, wherein the cathode material is LCO.

16. The lithium secondary battery of claim 14, wherein the lithium secondary battery reaches 86% charge capacity in about 20 min at the rate of 3 C, and 68% charge capacity in about 9 minutes at the rate of 5 C.

17. The lithium secondary battery of claim 15, wherein the lithium secondary battery reaches 96% charge capacity in about 64 min at the rate of 1 C, and 78% charge capacity in about 18 min at the rate of 3 C.

18. The lithium secondary battery of claim 15, wherein the lithium secondary battery has a discharge capacity in the range of 105-128 mAh/g at 0.5 C-5 C rate for the first cycle.

19. The lithium secondary battery of claim 15, wherein the lithium secondary battery exhibits cycling stability in the range of 85-90% at the rate of 0.5 C after discharging between 3-4.2 V for 50 cycles.

* * * * *